(12) United States Patent
Kroon et al.

(10) Patent No.: US 8,550,943 B2
(45) Date of Patent: Oct. 8, 2013

(54) MOUNTING UNIT OF A TRACTION ENGINE DRIVE

(75) Inventors: Petrus Hubertus Kroon, Erlangen (DE); Michael Kastner, Hirschaid (DE); Reinhard Koch, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 576 days.

(21) Appl. No.: 12/739,836

(22) PCT Filed: Sep. 17, 2008

(86) PCT No.: PCT/EP2008/062360
§ 371 (c)(1),
(2), (4) Date: Jun. 15, 2010

(87) PCT Pub. No.: WO2009/053171
PCT Pub. Date: Apr. 30, 2009

(65) Prior Publication Data
US 2010/0248876 A1    Sep. 30, 2010

(30) Foreign Application Priority Data

Oct. 26, 2007   (DE) .................... 10 2007 051 621
Apr. 25, 2008   (DE) .................... 10 2008 020 744

(51) Int. Cl.
*F16H 7/08*   (2006.01)
(52) U.S. Cl.
USPC .................................. 474/111; 474/273

(58) Field of Classification Search
CPC ........................................ F16H 7/18
USPC ......... 474/101, 110, 111, 113, 118, 133, 134, 474/136, 137, 140, 273; 123/90.31; 248/200, 220.21, 220.22
See application file for complete search history.

(56) References Cited

U.S. PATENT DOCUMENTS

2004/0005952 A1* 1/2004 Bachmair .................. 474/111
2007/0066428 A1* 3/2007 Tryphonos ................. 474/111

FOREIGN PATENT DOCUMENTS

| DE | 4025126 | 2/1992 |
|---|---|---|
| DE | 20207186 | 10/2003 |
| DE | 3909458 | 6/2005 |
| EP | 0793002 | 9/1997 |
| EP | 0848139 | 6/1998 |
| EP | 1531239 | 5/2005 |

* cited by examiner

*Primary Examiner* — Sang Kim
*Assistant Examiner* — Juan Campos, Jr.
(74) *Attorney, Agent, or Firm* — Volpe and Koenig, P.C.

(57) ABSTRACT

A traction engine drive (2), the components of which are integrated into an assembly unit (6) that can be pre-completed. A guide rail (7) having a clamp rail (10) is fixed in location by a clamping device (16) and a traction element (12) is disposed in conjunction with at least one traction mechanism wheel, so that a free length of the traction element is not present.

7 Claims, 4 Drawing Sheets

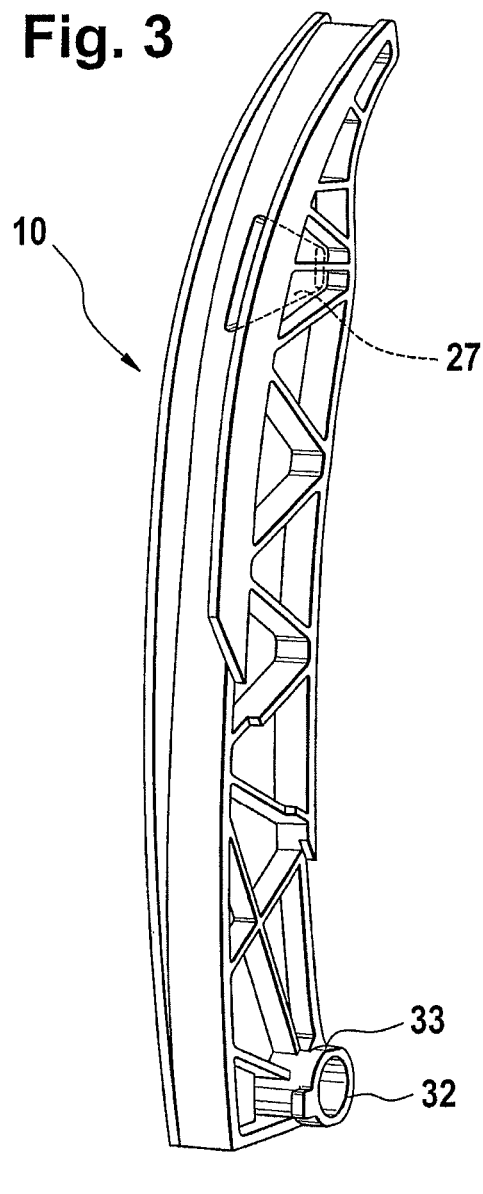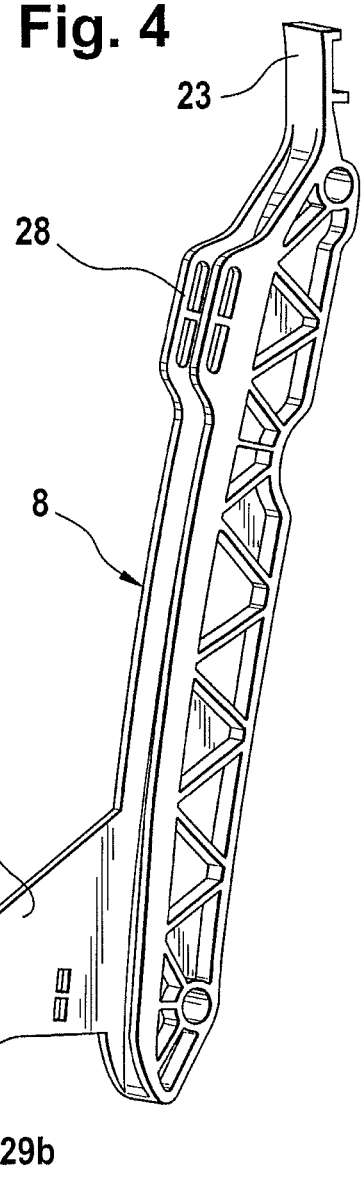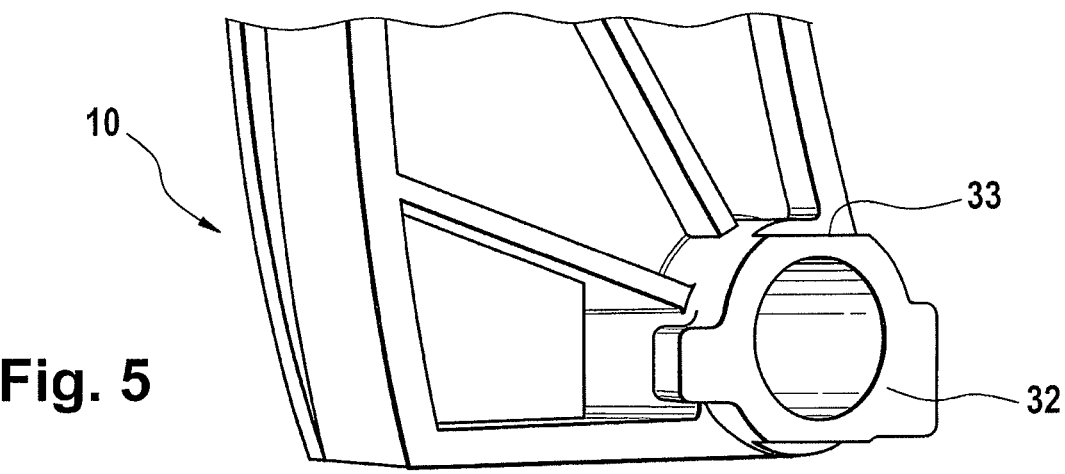

MOUNTING UNIT OF A TRACTION ENGINE DRIVE

BACKGROUND

The present invention relates to a mounting unit of a traction element drive that is constructed, in particular, as a chain drive that can be used in internal combustion engines. The traction element drive comprises a drive wheel and at least one driven wheel that are connected by a traction element, wherein a guide rail or a tensioning rail connected to a tensioning system is allocated to each section of the traction element.

From DE 39 09 458 A1, a mounting unit for a traction element drive is known that comprises a chain wheel holder as well as a chain guide element for the timing chain of an internal combustion engine. This mounting unit includes arc-shaped holders in which the chain wheels and the timing chain are loosely placed. A tensioning device allocated to the traction element drive is supported on the chain on the outside with a non-positive fit. Because the tensioning device is mounted biased in connection with the traction element drive, the mounting complexity increases, because, for example, influenced by the effect of the tensioning device, it is difficult to mount the chain wheels onto the associated shaft ends.

EP 0 848 139 A1 relates to a mounting unit in which the traction element wheels are inserted into holding pockets and are positioned by the traction element wrapping around these wheels and are fixed by a catch element of the holding device. The mounting unit includes an arc-shaped tensioning rail which is pressed upon, in the operating state, by a chain tensioner positioned on the engine block of the internal combustion engine. For the mounting, the tensioning rail is held by a catch element in a home position that generates a certain amount of biasing in the traction element.

In common, the mounting units described above are left in place after completion of the mounting on the internal combustion engine. With respect to the relatively high number of pieces in internal combustion engines and the decreasing cycle times due to advancing automation in the automotive industry, the mounting units in the individual components and functions are subject to a constant demand for improvement and adaptation to rising requirements.

SUMMARY

The present invention is based on the objective of providing a mounting unit for traction element drives whose components are positioned captively secured in a preassembled state optimally without a separate component.

This objective is met according to the invention by a mounting unit that comprises components leading or biasing the traction element, as well as the traction element of the traction element drive. Advantageously, the components forming a module are shaped and assembled so that these require no separate components, such as, e.g., a carrier element, in order to allow a secure mounting of the traction element drive in or on the internal combustion engine. According to the invention, the pivoting tensioning rail is connected on the end via a pivot to the guide rail that is fixed in position in the operating state and that has a one-part or multiple-part construction. For creating an effective and durable transport securing device, the tensioning rail is preferably fixed indirectly or directly by a clip connection to the guide rail. Furthermore, the mounting unit includes a holding segment by which at least one traction element wheel is held in the preassembled state and for simplified mounting.

Advantageously, the mounting unit according to the invention offers a fixed transport position for the guide rail and the tensioning rail, as well as at least one traction element wheel, wherein, in contrast to previous mounting units, a disadvantageous free traction element length without additional components is eliminated. The construction according to the invention further allows a large percentage of equivalent parts, so that the mounting unit can be used for different internal combustion engines by supplementing and/or replacing a few individual components.

Additional advantageous constructions are described below.

A preferred construction of the invention provides a pivot containing a rotational lock between the tensioning rail and the guide rail. This pivot known for example, from pipe or water-pump wrenches comprises a locally flattened cylindrical pin that is connected to the pivoting tensioning rail or the guide rail. The pin engages in two circular-ring-shaped contours of the associated additional component shaped to a large extent like an 8 and enclosing holders connected by a web. By pivoting the tensioning rail into an extreme position facing away from the operating position, there is the ability to move the pin into the contours, i.e., between the holders, because a pin dimension in the region of a flattened section is less than a width of the web. This pivot construction guarantees the use of tensioning and guide rails with equal dimensions for different internal combustion engines or for traction element drives with traction element layouts deviating from each other. Advantageously, in connection with these conditions, the component scope of a motor vehicle manufacturer can be reduced.

Preferably, the guide rail is provided integrally with a leg or a lever that is provided on the end with a component forming the pivot, the pin or the contours shaped like an 8 for the pivot. In the installed state, the pivot element of the guide rail engages with a positive fit in the associated, additional pivot element of the tensioning rail. As an alternative, it presents itself to provide the tensioning rail integrally with a leg or lever that encloses a pivot element on the end side.

As the transport securing device and simultaneously as the captive securing device in the preassembled state of the traction element drive, according to the invention a positive-fit and/or non-positive-fit clip connection is provided. A holder bounded by elastic brackets is preferably suitable for this purpose, wherein these brackets enclose catch tabs or projections that are directed toward each other and on which the tensioning rail engages. The brackets are arranged directly on the guide rail or on an additional component allocated to the guide rail.

For traction element drives with several driven wheels, for example, the timing drive including two camshafts in an internal combustion engine, it presents itself according to the invention to combine the stationary guide rail with an additional guide rail component. This measure allows the traction element to be guided in the tensioned section in the region between the timing wheels. In this way it is guaranteed that, in all of the section regions of the traction element, a guide rail or tensioning rail is allocated to the traction element. Advantageously, the two guide rails assembled into a unit are mounted permanently by a non-positive-fit and/or positive-fit connection. Sleeves that are allocated, for example, to a guide rail are suitable for this purpose, wherein these sleeves are fit with a positive-fit connection in corresponding holders of the additional guide rail and are secured by a clip connection.

An additional advantageous construction of the invention relates to an anti-jumping device for the traction element in the region of the traction element wheels. For this purpose, each guide rail has on the end a tongue-like projection that is adapted to the shape of the traction element wheels and that is set apart from the outer contours of the traction element in the radial direction and that effectively stops the traction element from jumping. This construction likewise presents itself for a multiple-part guide rail, in order to obtain an anti-jumping device in the region of all of the driven wheels of the traction element drive.

The mounting unit constructed as a module can be further expanded by a holding segment with which a traction element wheel can be positioned in a preassembled way. For holding the drive wheel in the mounting unit it presents itself to allocate the holding segment to the guide rail directly or to the leg of the guide rail. As an extension of this configuration, the invention includes additional holding segments, in order to hold all of the drive wheels and driven wheels of the traction element drive in the mounting unit.

As a suitable material for the tensioning rail and the guide rails, plastic, in particular, PA66/H is provided. As an alternative, additional plastics are suitable that satisfy all of the requirements for the use of the traction element drive with respect to wear and strength.

BRIEF DESCRIPTION OF THE DRAWINGS

An embodiment of the present invention will be explained below in detail with reference to drawings. Shown are.

DETAILED DESCRIPTION OF THE PREFERRED EMBODIMENTS

Figure 1:
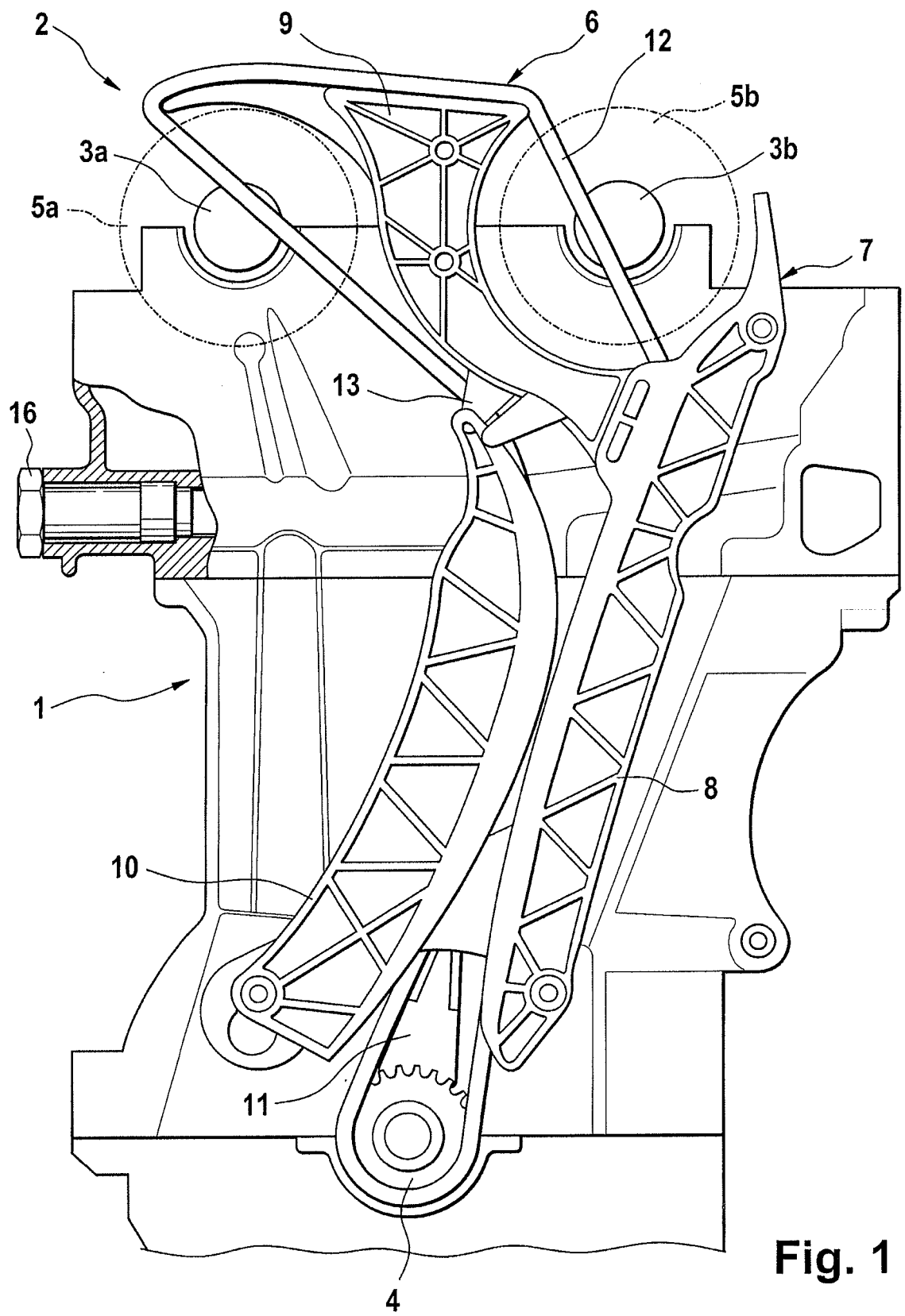
FIG. 1 the traction element drive of an internal combustion engine, whose individual parts form a mounting unit, FIG. 2 the traction element drive detached from the internal combustion engine in the operating state, FIG. 3 a view of the individual part tensioning rail, FIG. 4 a view of the individual part guide rail of the traction element drive, FIG. 5 an enlarged view of a cutout of the tensioning rail according to FIG. 3, FIG. 6 a view of an individual part sub-rail allocated to the guide rail.

FIG. 1 shows a portion of an internal combustion engine 1 and here illustrates a traction element drive 2 constructed as a timing drive in the preassembled state, wherein this drive is designed for driving two camshafts 3a, 3b, with driven wheels 5a, 5b drawn with dashed-dotted lines being allocated to each of these camshafts, respectively, in the operating state. The mounting unit 6 constructed as a module is limited exclusively to the components of the traction element drive 2. The mounting unit 6 comprises a guide rail 7 that is stationary in the operating state and that is made from a base rail 8 with an associated sub-rail 9. The mounting unit 6 further includes a pivoting tensioning rail 10, the drive wheel 4 positioned by a holding segment 11, as well as traction element 12 wrapping around the drive wheel 4 and guided further on the rails. In the delivery state of the mounting unit 6, the tensioning rail 10 is fixed in position on the sub-rail 9 by a transport securing device 13. As the transport securing device 13, a clip connection shown in FIG. 5 is provided that has two projecting, elastic brackets 14a, 14b set apart in the axial direction with local projections 15a, 15b that are directed toward each other and on which the tensioning rail 10 locks in the transport position. The construction of the mounting unit 6 causes a certain biasing of the traction element 12 in the transport position, wherein a disadvantageous free length of the traction element 12 is eliminated, which advantageously allows an unimpaired transport of the mounting unit 6 including all of the components of the traction element drive 2. As a deviation from the diagram according to FIG. 1, it presents itself that the mounting unit 6 also includes the driven wheels 5a, 5b that are drawn with dashed-dotted lines and that are guided securely in the mounting unit 6 likewise wrapped around by the traction element 12. In order to guarantee the changed traction-means guidance required here, a modified transport securing device 13 can be used accordingly in which the tensioning rail 10 partially pivoted in the counterclockwise direction is fixed in a position deviating from that in FIG. 1. In the operating state, the tensioning rail 10 is pivoted until it contacts the tensioning device 16 positioned stationary in the internal combustion engine 1, by which a sufficient biasing of the traction element 12 is always guaranteed.

Figure 2:
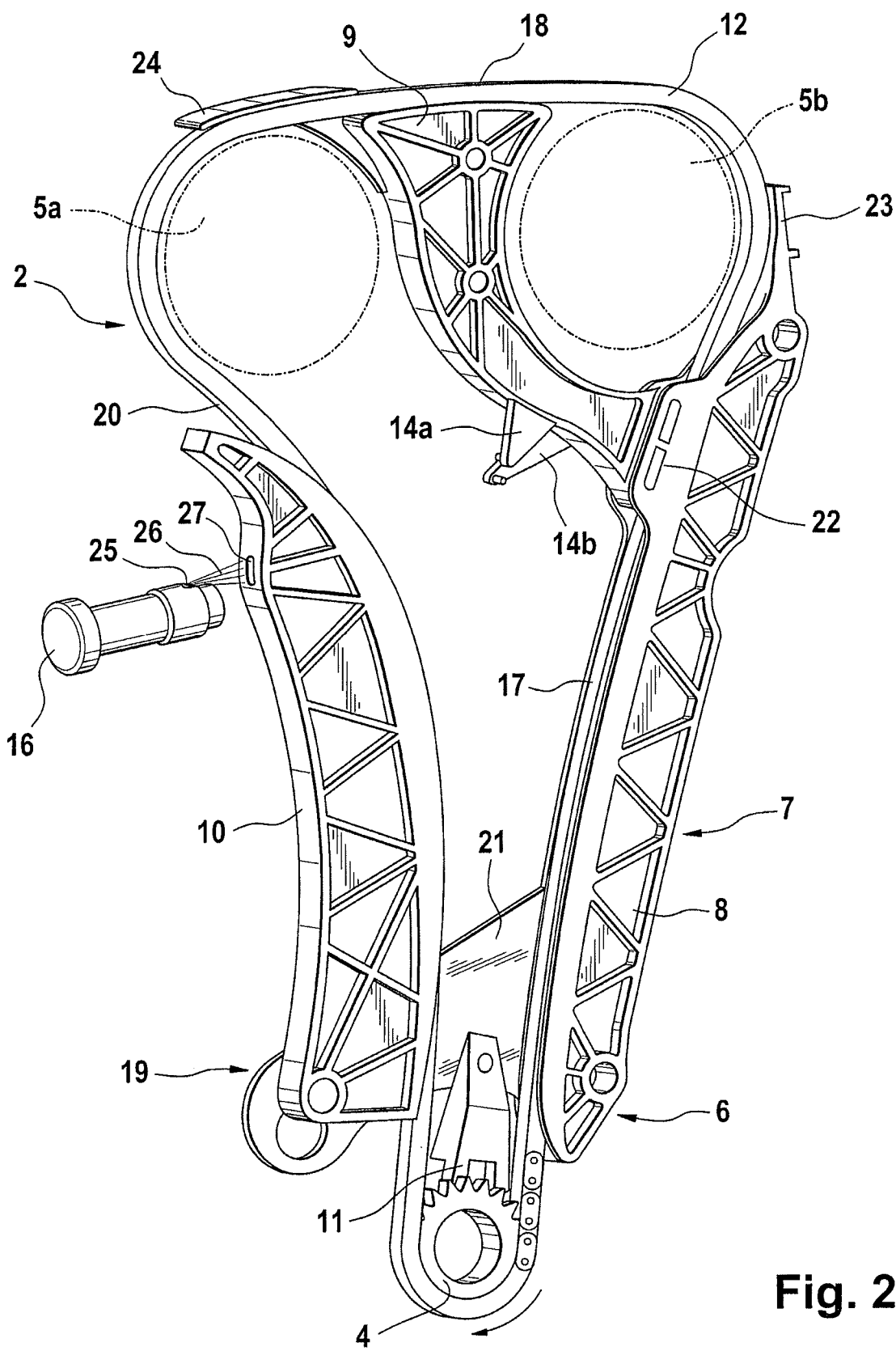

FIG. 2 shows additional details of the traction element drive 2 forming a mounting unit 6. In a first tensioned section 17 set between the drive wheel 4 and the driven wheel 5b, the base rail 8 of the guide rail 7 is supported on the traction element drive 2 rotating in the clockwise direction. The sub-rail 9 is allocated on the inside to the traction element 12 to the additional tensioned section 18 set between the driven wheels 5a, 5b. The tensioning rail 10 that can pivot via a pivot 19 is supported on the traction element 12 on the outside in a slack section 20, wherein the supporting force is triggered by the tensioning device 16. The pivot 19 is formed by the leg 21 mounted integrally on the base rail 8 as well as the tensioning rail 10. The leg 21 further includes the holding segment 11 by which a position of the drive wheel 4 in the transport position of the mounting unit (6) is guaranteed. The construction of the guide rail 7 provides that the sub-rail 9 to a large extent filling up the intermediate space set between the driven wheels 5a, 5b is connected preferably by a positive-fit and/or non-positive-fit attachment 22 to the base rail 8. In common, both the base rail 8 and also the sub-rail 9 include a tongue-like anti-jumping device 23, 24 that extends in the direction of the associated driven wheel 5a, 5b and stops a disadvantageous lifting of the traction element 12 from the driven wheels 5a, 5b. The tensioning device 16 has a vent 25 on the tensioning-rail side via which air enclosed in the tensioning device 16 in the operating state of the traction element drive 2 can escape unimpaired. Furthermore, the vent 25 allows a dosed discharge of the hydraulic fluid that can be used for lubricating the traction element 12. For this purpose, a jet 26 coming from the vent 25 is led selectively through an opening 27 of the tensioning rail 10 onto the traction element 12.

FIGS. 3 and 4 each show the tensioning rail 10 and the base rail 8 of the guide rail 7 in a individual-part views. The base rail 8 forms a contact 28 that is a component of the attachment 22 for the sub-rail 9 offset to the anti-jumping device 23. On the end facing away from the anti-jumping device 23, the base rail 8 comprises a projecting leg 21 that has, on the free end, contours 30 that are essentially shaped like an 8 and that include two circular-ring-shaped holders 29a, 29b set apart from each other and connected by a web 31. With a pin 32 of the tensioning rail 10, the contours 30 form the pivot 19. A shift of the pin 32 locked in the holder 29a into the holder 29b requires a pivot of the tensioning rail 10 into an extreme position in which a cross section set by a flattened section 33 of the pin 32 is produced that is less than a width dimension of the web 31. FIG. 5 shows the pin 32 in an enlarged diagram and illustrates the flattened section 33.

Figure 6:
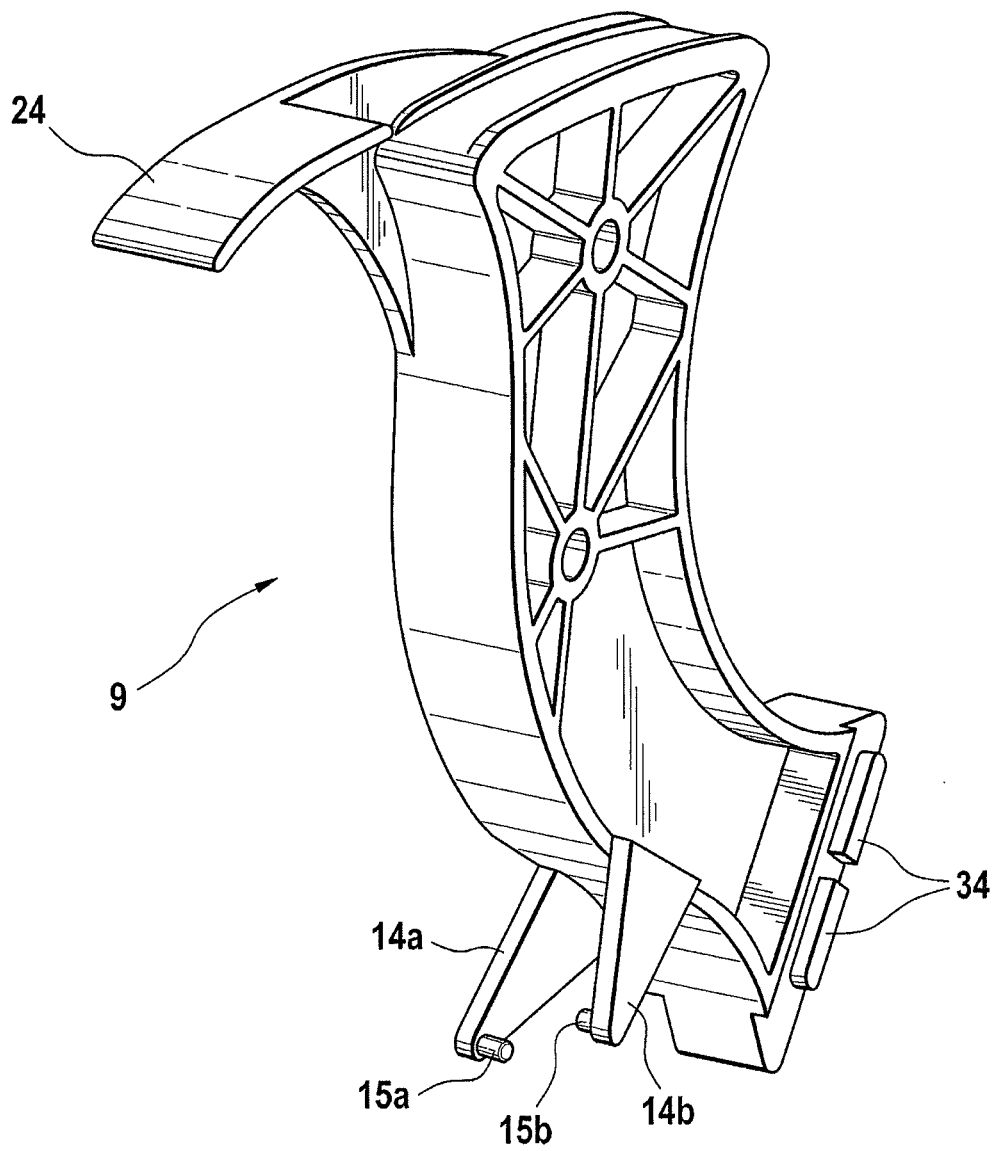

FIG. 6 shows, as an individual part, the sub-rail 9 of the guide rail 7 in a perspective view. The sub-rail 9 is supported in the installed state by a contact face 34 on the support face 28 of the base rail and is fixed by the attachment 22. The sub-rail 9 further includes brackets 14a, 14b that are set apart from each other and that have projections 15a, 15b that are directed toward each other and on which the tensioning rail 10 locks for forming the transport securing device 13.

LIST OF REFERENCE SYMBOLS

1 Internal combustion engine
2 Tensioning means drive
3a Camshaft
3b Camshaft
4 Drive wheel
5a Driven wheel
5b Driven wheel
6 Assembly unit
7 Guide rail
8 Base rail
9 Sub-rail
10 Tensioning rail
11 Holding segment
12 Traction element
13 Transport securing device
14a Bracket
14b Bracket
15a Projection
15b Projection
16 Tensioning device
17 Tensioned section
18 Tensioned section
19 Pivot
20 Slack section
21 Leg
22 Attachment
23 Anti-jumping device
24 Anti-jumping device
25 Vent
26 Jet
27 Opening
28 Contact
29a Holder
29b Holder
30 Contours
31 Web
32 Pin
33 Flattened section
34 Contact face

The invention claimed is:

1. Mounting unit of a traction element drive for an internal combustion engine, the unit comprises a drive wheel and at least one driven wheel that are connected by a traction element; a guide rail and a pivoting tensioning rail are allocated to respective sections of the traction element, the mounting unit includes components guiding and biasing the traction element including at least one of the drive wheel or the at least one driven wheel positioned by a holding segment, as well as the traction element, which are preassembled externally and combined captively secured into a module, the pivoting tensioning rail is connected by a pivot to the guide rail the guide rail is adapted to be positioned stationary in an operating state and constructed integrally therewith and the tensioning rail can be fixed by a transport securing device indirectly or directly on the guide rail, and the guide rail has a base rail and a sub-rail that are connected permanently by an attachment, the tensioning rail is connected by the pivot which includes a rotational positional lock to the guide rail, and a locally flattened, cylindrical pin of the tensioning rail engages in contours of the guide rail as the pivot, wherein a leg allocated to the guide rail is provided for holding the pin or the contours, and the contours include two circular-ring-shaped holder openings connected by a reduced width opening, and the pin can be adjusted in the contours by pivoting the tensioning rail into an extreme position facing away from the operating position between the holder openings, as a pin dimension in a region of a flattened section of the pin is less than a width of the reduced width opening.

2. Mounting unit of a traction element drive according to claim 1, wherein the leg allocated to the tensioning rail includes, on an end thereof, the pin or the contours.

3. Mounting unit of a traction element drive according to claim 2, wherein the at least one transport securing device acting as a positive-fit or non-positive-fit connection is provided between the tensioning rail and the guide rail.

4. Mounting unit of a traction element drive according to claim 3, wherein the sub-rail is connected to the base rail by at least two clipped-on sleeves in a region of the attachment.

5. Mounting unit of a traction element drive according to claim 4, wherein the base rail as well as the sub-rail of the guide rail each enclose an anti jumping device for the traction element in a region of the driven wheels that are separated from each other.

6. Mounting unit of a traction element drive according to claim 5, wherein a holding segment positioning the traction element wheel is allocated to at least one sub-segment of the base rail or the sub-rail of the guide rail.

7. Mounting unit of a traction element drive according to claim 6, wherein the guide rail and the tensioning rail are produced from plastic.

* * * * *